Nov. 10, 1925.  
W. L. NETTLESHIP  
1,560,842  
FROZEN CONFECTION AND METHOD OF MAKING THE SAME  
Filed June 4, 1924
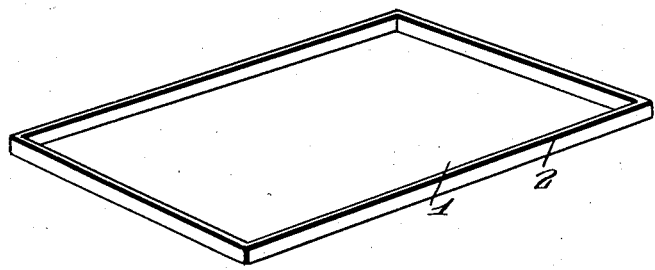
Fig. 1.
Fig. 2.
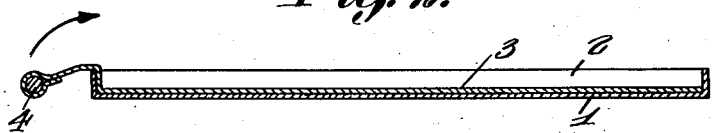
Fig. 3.
Fig. 4.
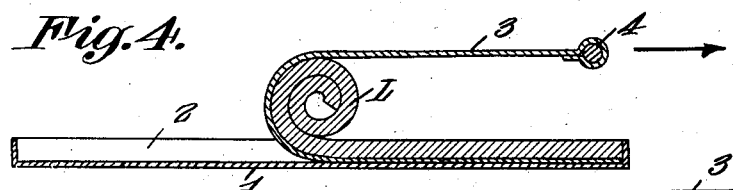
Fig. 5.
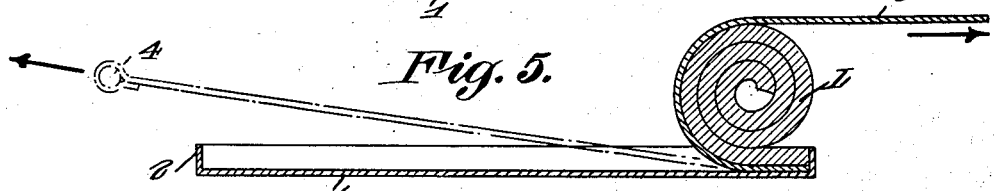
Fig. 6.
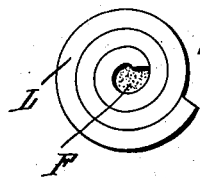
W. L. Nettleship,  
Inventor
By CA Snow & Co.  
Attorneys.

Patented Nov. 10, 1925.

1,560,842

UNITED STATES PATENT OFFICE.

WILLIAM L. NETTLESHIP, OF SOUTH TACOMA, WASHINGTON.

FROZEN CONFECTION AND METHOD OF MAKING THE SAME.

Application filed June 4, 1924. Serial No. 717,808.

*To all whom it may concern:*

Be it known that I, WILLIAM L. NETTLESHIP, a citizen of the United States, residing at South Tacoma, in the county of Pierce and State of Washington, have invented a new and useful Frozen Confection and Method of Making the Same, of which the following is a specification.

This invention relates to a frozen confection and to a method of making the same, one of the objects of the invention being to provide a confection in the form of a roll made of ice cream or other similar confection.

A further object is to provide an improved method whereby a roll of material of this kind can be formed readily, producing an attractive article that can be handled readily.

With the foregoing and other objects in view the invention consists of certain novel details of construction and of certain novel steps in the method of manufacture hereinafter more fully described and pointed out in the claims, it being understood that various changes may be made within the scope of the invention as claimed without departing from the spirit of the invention.

In the accompanying drawings the preferred form of the invention has been shown.

In said drawings—

Fig. 1 is a perspective view of a tray used in the manufacture of the confection.

Fig. 2 is a longitudinal section through the tray showing the first state of manufacture.

Fig. 3 is a similar view showing the next step in the process of manufacturing the confection.

Fig. 4 is a similar section showing a further step in the process of manufacture.

Fig. 5 is a view similar to Figs. 2 to 4 inclusive showing the final step in the method of manufacture.

Fig. 6 is an end view of the confection produced by this process.

Referring to the figures by characters of reference, 1 designates a tray preferably formed with side walls or flanges 2. A sheet 3 of parchment or other suitable material is adapted to be placed upon the bottom of the tray with one end projecting beyond the tray. This projecting ends is preferably reinforced by means of a cross rod 4 of wood or the like about which the end of the strip is wrapped, and secured.

If the confection is to be formed of ice cream, a layer of the material is spread over the parchment to the height of the walls or the flanges 2, the ice cream, during this operation, being of a temperature permitting it to be bent without flowing. After the material has thus been placed in the tray or pan the projecting end of the strip is swung over one end of the tray and then pulled in the direction indicated by the arrow in Fig. 3. This will cause one end of the layer of material indicated at L to curl upwardly and roll as shown in Figs. 4 and 5, this operation continuing until the entire layer has been formed into a roll. The confection is then hardened by freezing and the completed article will appear as shown in Fig. 6 ready to be packaged.

Obviously the layer L can be formed of different kinds of ice cream, ices, etc., and the resultant product shown in Fig. 6 can be made very attractive by using materials of different colors. Furthermore, if desired, a suitable filling can be placed in the central opening within the confection. This has been indicated at F and can consist of fruit, water ice, etc.

What is claimed is:—

1. The herein described method of producing a confection which consists in placing a flexible strip of material upon the bottom of a tray, covering the material with a partially frozen material to be formed into a confection, drawing one end of the flexible strip over the partially frozen material to roll said material into spiral form.

2. The herein described method of producing a confection which consists in placing a flexible strip upon the bottom of a tray with one end projecting beyond the tray, covering the strip and filling the tray with a partially frozen layer of material of which the confection is to be formed, pulling the projecting end of the strip toward the opposed end to coil the layer of confection material to provide a spirally wound confection.

3. The herein described method of producing a confection which consists in placing a flexible strip upon the bottom of a tray with one end projecting beyond the tray, covering the strip and filling the tray with a partially frozen layer of material of which the confection is to be formed, pulling the projecting end of the strip toward the opposed end to coil the layer of confection material to provide a spirally wound confection, and finally hardening the confection by freezing.

4. A frozen confection comprising a spirally wrapped layer of ice cream.

5. A frozen confection comprising a spirally wrapped layer of ice cream, there being a central opening through the confection.

6. A frozen confection comprising a spirally wrapped layer of ice cream, there being a central opening through the confection, and an edible filling within the opening.

In testimony that I claim the foregoing as my own, I have hereto affixed my signature.

WILLIAM L. NETTLESHIP.